(12) United States Patent
Kusama et al.

(10) Patent No.: US 7,679,773 B2
(45) Date of Patent: Mar. 16, 2010

(54) IMAGE PROCESSING METHOD AND APPARATUS, STORAGE MEDIUM, AND PROGRAM

(75) Inventors: Kiyoshi Kusama, Tokyo (JP); Kunihiro Yamamoto, Kanagawa (JP); Takuya Kotani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1307 days.

(21) Appl. No.: 10/375,171

(22) Filed: Feb. 28, 2003

(65) Prior Publication Data

US 2003/0179928 A1 Sep. 25, 2003

(30) Foreign Application Priority Data

Mar. 19, 2002 (JP) ............... 2002-075983

(51) Int. Cl.
*G06K 15/00* (2006.01)

(52) U.S. Cl. .................. 358/1.18; 358/1.1; 358/1.2; 358/1.9; 358/1.15; 358/1.16; 358/537; 358/501; 358/401; 358/448; 358/449; 358/451; 358/452; 382/180; 382/256; 382/258; 382/266; 382/284; 382/286; 382/298; 382/299; 382/300

(58) Field of Classification Search ............... 358/1.15, 358/1.1, 1.2, 1.9, 1.16, 1.18, 537, 501, 401, 358/448, 449, 451, 452; 382/180, 256, 258, 382/266, 284, 286, 298, 300
See application file for complete search history.

(56) References Cited

U.S. PATENT DOCUMENTS

| 6,031,529 | A | * | 2/2000 | Migos et al. ................ 715/783 |
| 6,069,713 | A | | 5/2000 | Kusama ....................... 358/452 |
| 6,141,459 | A | * | 10/2000 | Gendel ......................... 382/256 |
| 6,168,259 | B1 | * | 1/2001 | Capurso ....................... 347/36 |
| 6,191,406 | B1 | * | 2/2001 | Nelson et al. ............. 250/208.1 |
| 6,198,494 | B1 | * | 3/2001 | Haraguchi et al. .......... 347/232 |
| 6,239,817 | B1 | * | 5/2001 | Meyer ......................... 347/36 |
| 6,614,564 | B1 | * | 9/2003 | Sakaguchi ................. 358/487 |
| 6,719,466 | B2 | * | 4/2004 | Edatsune et al. .............. 400/61 |
| 6,765,691 | B2 | * | 7/2004 | Kubo et al. ................. 358/1.9 |
| 6,850,273 | B1 | * | 2/2005 | Yoshida et al. ........... 348/231.3 |
| 7,059,785 | B2 | * | 6/2006 | Kato et al. .................... 400/62 |
| 7,255,411 | B2 | * | 8/2007 | Endo ........................... 347/12 |
| 7,286,258 | B2 | * | 10/2007 | Schnoebelen et al. ...... 358/1.18 |
| 7,298,520 | B2 | * | 11/2007 | Ohkubo et al. ............. 358/1.18 |
| 2002/0033851 | A1 | * | 3/2002 | Waldner et al. ................ 347/5 |
| 2002/0131060 | A1 | * | 9/2002 | Maier et al. .................. 358/1.2 |
| 2003/0142954 | A1 | | 7/2003 | Kotani et al. ................. 358/52 |
| 2003/0147097 | A1 | * | 8/2003 | Kotani et al. ............... 358/1.18 |
| 2003/0169921 | A1 | | 9/2003 | Yamamoto .................. 382/170 |
| 2004/0247359 | A1 | * | 12/2004 | Koto et al. ..................... 400/62 |

* cited by examiner

*Primary Examiner*—David K Moore
*Assistant Examiner*—Benjamin O Dulaney
(74) *Attorney, Agent, or Firm*—Fitzpatrick, Cella, Harper & Scinto

(57) ABSTRACT

According to the present invention, in a borderless printing mode, a printing region is determined from an original image, a region expanded outward is determined for borderless printing based on the determined region. When the thus determined region exceeds the region of the original image, an image in the surplus portion is extrapolated based on an image at end portions of the original image, and printing data is formed based on the extrapolated image and image data of the expanded region.

15 Claims, 14 Drawing Sheets

601 MAGNIFIED-DISPLAY WINDOW

602 DETERMINATION BUTTON

IMAGE PROCESSING METHOD AND APPARATUS, STORAGE MEDIUM, AND PROGRAM

BACKGROUND OF THE INVENTION

1. Field of the Invention

The present invention relates to an image processing method and apparatus, a storage medium, and a program for printing an image on a recording medium.

2. Description of the Related Art

As the use of digital cameras has become widespread, it is requested to easily print digital photographs taken by a digital camera using a printer provided in a home. Furthermore, for example, as the quality of a picture obtained by a printer has increased and a function of borderless printing has become installed, it has become possible to easily print and see a digital photograph as a borderless photograph having quality equivalent to the quality of a silver halide photograph obtained by developing an ordinary film, even at a home.

In conventional borderless printing, image data having a size larger than the size of a printing sheet is transmitted to a printer, and borderless printing is realized by printing the corresponding image so as to exceed the sheet size. In this case, however, a portion of the image exceeding the sheet is lost, and the angle of visibility differs between the printed image and the original image.

There exist printers in which borderless printing is realized by transmitting image data whose size is the same as the sheet size, instead of performing printing so as to exceed the sheet size. Such printers, however, have the problem that a white frame appears in a printed photograph due to an error in feeding or cutting of a sheet.

SUMMARY OF THE INVENTION

The present invention has been made in consideration of the above-described problems.

It is an object of the present invention to provide an image processing method and apparatus, a storage medium and a program in which, even if a region expanded outward for borderless printing exceeds the region of an original image, it is possible to perform printing without producing a white frame, without changing the angle of visibility of an image to be printed.

According to one aspect, the present invention which achieves the above-described object relates to an image processing method including a first region determining step of determining a printing region from an original image, a second region determining step of determining a region expanded outward for borderless printing, based on the region determined in the first region determining step, a discrimination step of discriminating whether or not the region determined in the second region determining step exceeds the region of the original image, an extrapolation step of extrapolating, when the result of the discrimination in the discrimination step is affirmative, an image of the surplus region based on an image at end portions of the original image, and a formation step of forming printing data based on the image extrapolated in the extrapolation step and image data of the region determined in the second region determining step.

It is another object of the present invention to provide an image processing method and apparatus, a storage medium and a program in which, even if a printing region for borderless printing deviates from end portions of an original image, it is possible to perform printing without producing a white frame, without changing the angle of visibility of an image of the printing region.

According to another aspect, the present invention which achieves the above-described object relates to an image processing method including a region determining step of determining a printing region from an original image, a discrimination step of discriminating whether or not the region determined in the region determining step is within a predetermined distance from respective end portions of the original image, and a formation step of forming image data for borderless printing by expanding the region determined in the region determining step for borderless printing. When the result of the discrimination in the discrimination step is affirmative, then, in the formation step, image data extrapolated based on an image at the end portion of the original image is added.

It is still another object of the present invention to provide an image processing method and apparatus, a storage medium and a program in which, even if a portion where an image is absent is produced at end portions of an image region for rimless printing, it is possible to perform printing without producing a white frame, without changing the angle of visibility of an image of a printing portion.

According to still another aspect, the present invention which achieves the above-described object relates to an image processing method including an image region assigning step of assigning a part or the entirety of an image as a printing region, a formation step of forming borderless-printing image data for performing borderless printing of the region assigned in the image region assigning step, and an extrapolation processing step of performing image extrapolation processing when a portion where an image is absent is produced at end portions of the borderless-printing image data formed in the formation step.

According to still a further aspect, the present invention relates to an image processing apparatus including first region determining means for determining a printing region from an original image, second region determining means for determining a region expanded outward for borderless printing, based on the region determined by the first region determining means, discrimination means for discriminating whether or not the region determined by the second region determining means exceeds the region of the original image, extrapolation means for extrapolating, when the result of the discrimination by the discrimination means is affirmative, an image of the surplus region based on an image at end portions of the original image, and formation means for forming printing data based on the image extrapolated by the extrapolation means and image data of the region determined by the second region determining means.

According to yet a further aspect, the present invention relates to an image processing apparatus including region determining means for determining a printing region from an original image, discrimination means for discriminating whether or not the region determined by the region determining means is within a predetermined distance from respective end portions of the original image, and formation means for forming image data for borderless printing by expanding the region determined by the region determining means for borderless printing. When the result of the discrimination by the discrimination means is affirmative, the formation means adds image data extrapolated based on an image at the end portions of the original image.

According to still another aspect, the present invention relates to an image processing apparatus including image region assigning means for assigning a part or the entirety of an image as a printing region, formation means for forming borderless-printing image data for performing borderless printing of the region assigned by the image region assigning means, and extrapolation processing means for performing image extrapolation processing when a portion where an image is absent is produced at end portions of the borderless-printing image data formed by the formation means.

According to still another aspect, the present invention relates to a computer readable storage medium storing a program for executing an image processing method. The image processing method includes a first region determining step of determining a printing region from an original image, a second region determining step of determining a region expanded outward for borderless printing, based on the region determined in the first region determining step, a discrimination step of discriminating whether or not the region determined in the second region determining step exceeds the region of the original image, an extrapolation step of extrapolating, when the result of the discrimination in the discrimination step is affirmative, an image of the surplus region based on an image at end portions of the original image, and a formation step of forming printing data based on the image extrapolated in the extrapolation step and image data of the region determined in the second region determining step.

According to still another aspect, the present invention relates to a computer readable storage medium storing a program for executing an image processing method. The image processing method includes a region determining step of determining a printing region from an original image, a discrimination step of discriminating whether or not the region determined in the region determining step is within a predetermined distance from respective end portions of the original image, and a formation step of forming image data for borderless printing by expanding the region determined in the region determining step for borderless printing. When the result of the discrimination in the discrimination step is affirmative, then, in the formation step, image data extrapolated based on an image at the end portion of the original image is added.

According to still another aspect, the present invention relates to a computer readable storage medium storing a program for executing an image processing method. The image processing method includes an image region assigning step of assigning a part or the entirety of an image as a printing region, a formation step of forming borderless-printing image data for performing borderless printing of the region assigned in the image region assigning step, and an extrapolation processing step of performing image extrapolation processing when a portion where an image is absent is produced at end portions of the borderless-printing image data formed in the formation step.

According to still another aspect, the present invention relates to a program for executing an image processing method. The image processing method includes a borderless-printing-mode assigning step of assigning a borderless printing mode in which a margin is not produced at peripheral portions of a recording medium, a first region determining step of determining a printing region from an original image, a second region determining step of determining a region expanded outward for borderless printing, based on the region determined in the first region determining step, a discrimination step of discriminating whether or not the region determined in the second region determining step exceeds the region of the original image, an extrapolation step of extrapolating, when the result of the discrimination in the discrimination step is affirmative, an image of the surplus region based on an image at end portions of the original image, and a formation step of forming printing data based on the image extrapolated in the extrapolation step and image data of the region determined in the second region determining step.

According to still another aspect, the present invention relates to a program for executing an image processing method. The image processing method includes a region determining step of determining a printing region from an original image, a discrimination step of discriminating whether or not the region determined in the region determining step is within a predetermined distance from respective end portions of the original image, and a formation step of forming image data for borderless printing by expanding the region determined in the region determining step for borderless printing. When the result of the discrimination in the discrimination step is affirmative, then, in the formation step, image data extrapolated based on an image at the end portions of the original image is added.

According to still another aspect, the present invention relates to a program for executing an image processing method. The image processing method includes an image region assigning step of assigning a part or the entirety of an image as a printing region, a formation step of forming borderless-printing image data for performing borderless printing of the region assigned in the image region assigning step, and an extrapolation processing step of performing image extrapolation processing when a portion where an image is absent is produced at end portions of the borderless printing image data formed in the formation step.

The foregoing and other objects, advantages and features of the present invention will become more apparent from the following detailed description of the preferred embodiment taken in conjunction with the accompanying drawings.

DETAILED DESCRIPTION OF THE PREFERRED EMBODIMENT

A preferred embodiment of the present invention will now be described with reference to the drawings.

Figure 1:
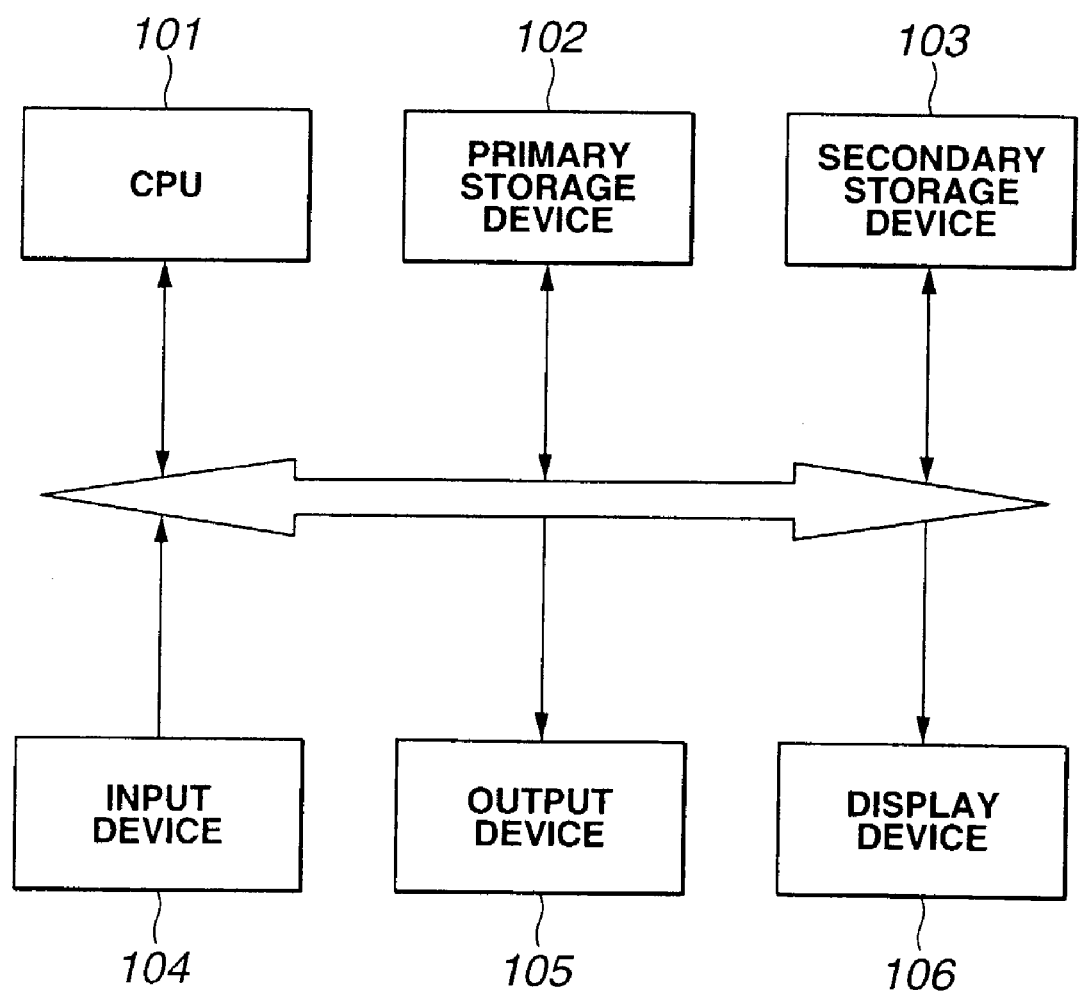
FIG. 1 is a block diagram illustrating the configuration of an image processing system.

FIG. 1 is a diagram illustrating an outline of an image processing system according to the preferred embodiment.

In FIG. 1, a CPU (central processing unit) 101 controls operations of the entire system, and for example, executes a program stored in a primary storage device 102. The primary storage device 102 comprises a semiconductor memory, such as a RAM (random access memory) or the like, and reads and stores programs stored in a secondary storage device 103. The secondary storage device 103 comprises, for example, a hard disk. In general, the capacity of the primary storage device is smaller than the capacity of the secondary storage device. Accordingly, programs, data and the like that cannot be completely stored in the primary storage device are stored in the secondary storage device. Data and the like that must be stored for a long time are also stored in the secondary storage device. In this embodiment, programs are stored in the secondary storage device 103. When executing a program, the program is read into the primary storage device 102 and is executed by the CPU 101. An input device 104 comprises, for example, a mouse (pointing device), a keyboard or the like. The input device 104 is used, for example, for transmitting an interrupt signal to a program or the like. An output device 105 comprises a printer. Any other appropriate device may, of course, be used as the output device 105. A display device 106 also operates as a display unit for realizing a GUI (graphical user interface), and displays various setting picture frames and images.

In this embodiment, a configuration is assumed in which an input image or a stored image is printed by installing application software having a printing control function in a computer. However, a configuration in which a driver program for a printer having functions to be described below is installed in a personal computer, or a configuration in which similar functions are provided within a printer may also be adopted. Particularly, it is effective to apply the present invention to a printer that can be connected to a digital camera without using a personal computer, or that can mount a memory card storing images, and in which an image is printed by reading the image from the camera or the memory card.

First, a description will be provided of the image processing system (printing system) of the embodiment. The image processing system of the embodiment assigns an image to be printed, a printing medium, a layout or the like according to a GUI using the input device 104 and the display device 106. The image processing system also has an editing function of performing easy editing of an image to be printed.

Figure 2:
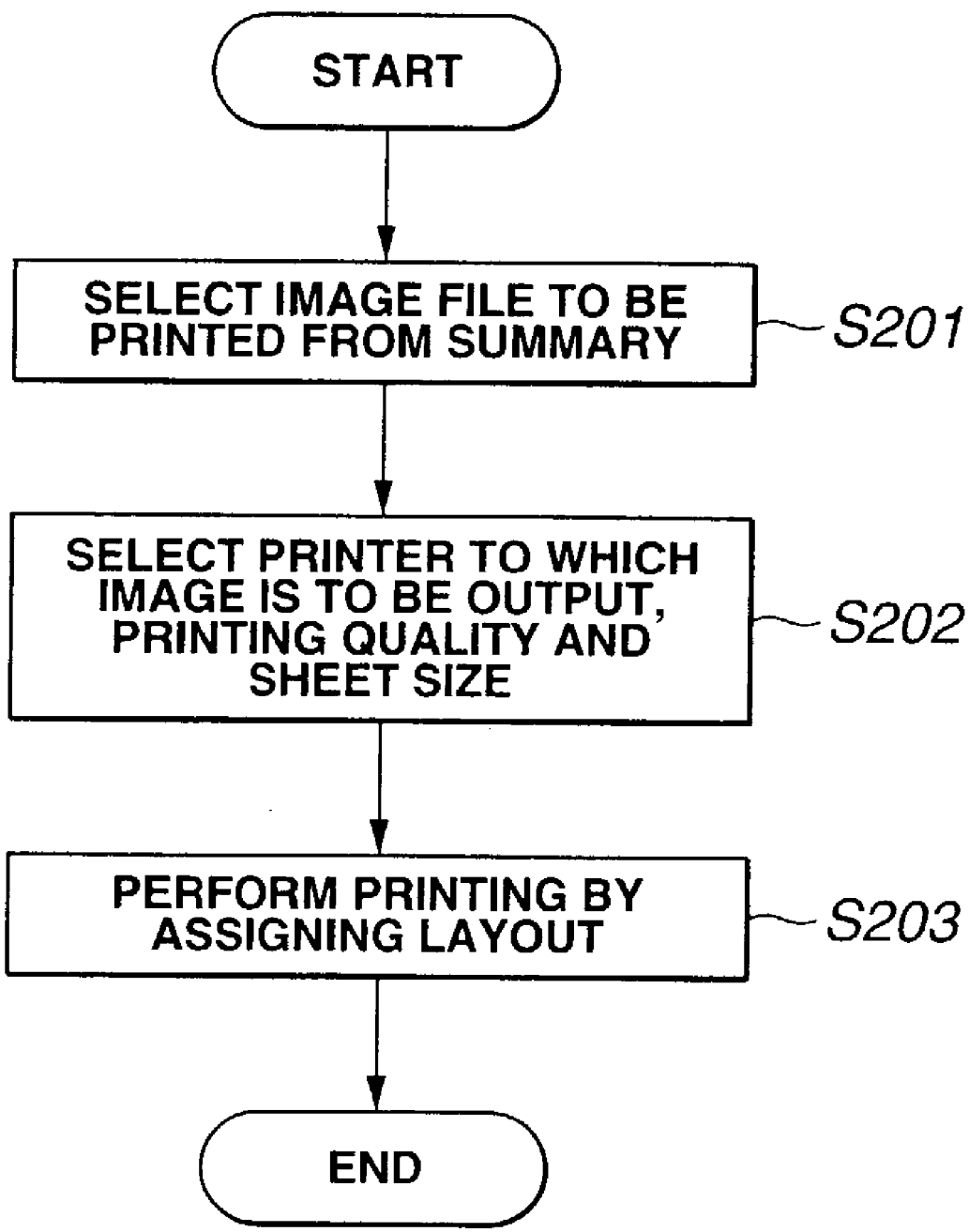
FIG. 2 is a flowchart illustrating a printing procedure.

The above-described four functions will now be described with reference to the drawings. FIG. 2 is a flowchart illustrating the basic flow of the operation procedure of the image processing system.

First, in step S201, an image to be printed is selected from a summary of images displayed on the display device 106 using the input device 104. Then, in step S202, a printing setting picture frame is displayed on the display device 106, and a printer to which the image is to be output and a printing sheet are selected. Finally, in step S203, a layout is determined on the printing setting picture frame, and printing is performed. Easy editing is performed by moving to an editing picture frame by depressing a button provided on the printing setting picture frame. After completing the editing, the picture frame returns to the printing setting picture frame. The details of operations in the respective steps will now be described with reference to the drawings.

Figure 3:
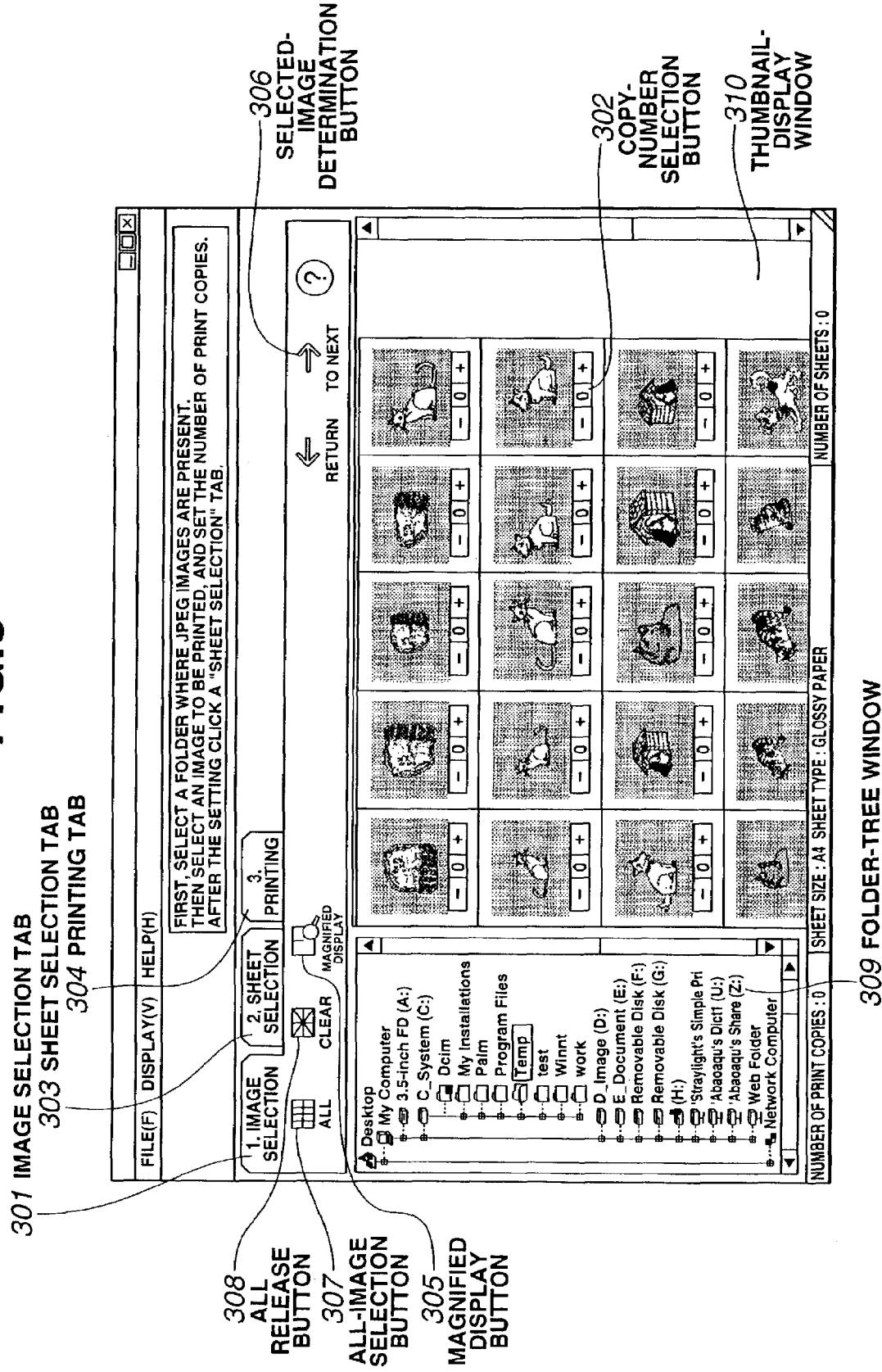
FIG. 3 is a diagram illustrating an outline of an image selection picture frame.

FIG. 3 is a diagram illustrating an outline of a picture frame for assigning an image to be printed. This picture frame is one of setting picture frames in application software for printing. In FIG. 3, an image selection tab 301 is for displaying a picture frame for selecting an image. A print-copy-number selection button 302 for assigning the number of print copies is provided for each image. A sheet selection tab 303 is for displaying a picture frame for selecting a recording sheet. A printing tab 304 is for displaying a picture frame for selecting a printing layout. A magnified-display button 305 is for assigning magnified display of a selected image. A determination button 306 is for shifting to a printing-sheet selection picture frame after selecting the image. An all-image selection button 307 is for selecting all displayed images. An all release button 308 is for releasing a state of image selection. A folder-tree window 309 for displaying the optical image of each folder displays a tree indicating a directory constructed in the storage device. The user can select a directory that stores necessary data by tracing this tree. When image files are stored in the selected directory, a thumbnail image (reduced image) of each of the image files is displayed on a display window 310.

Figure 6:
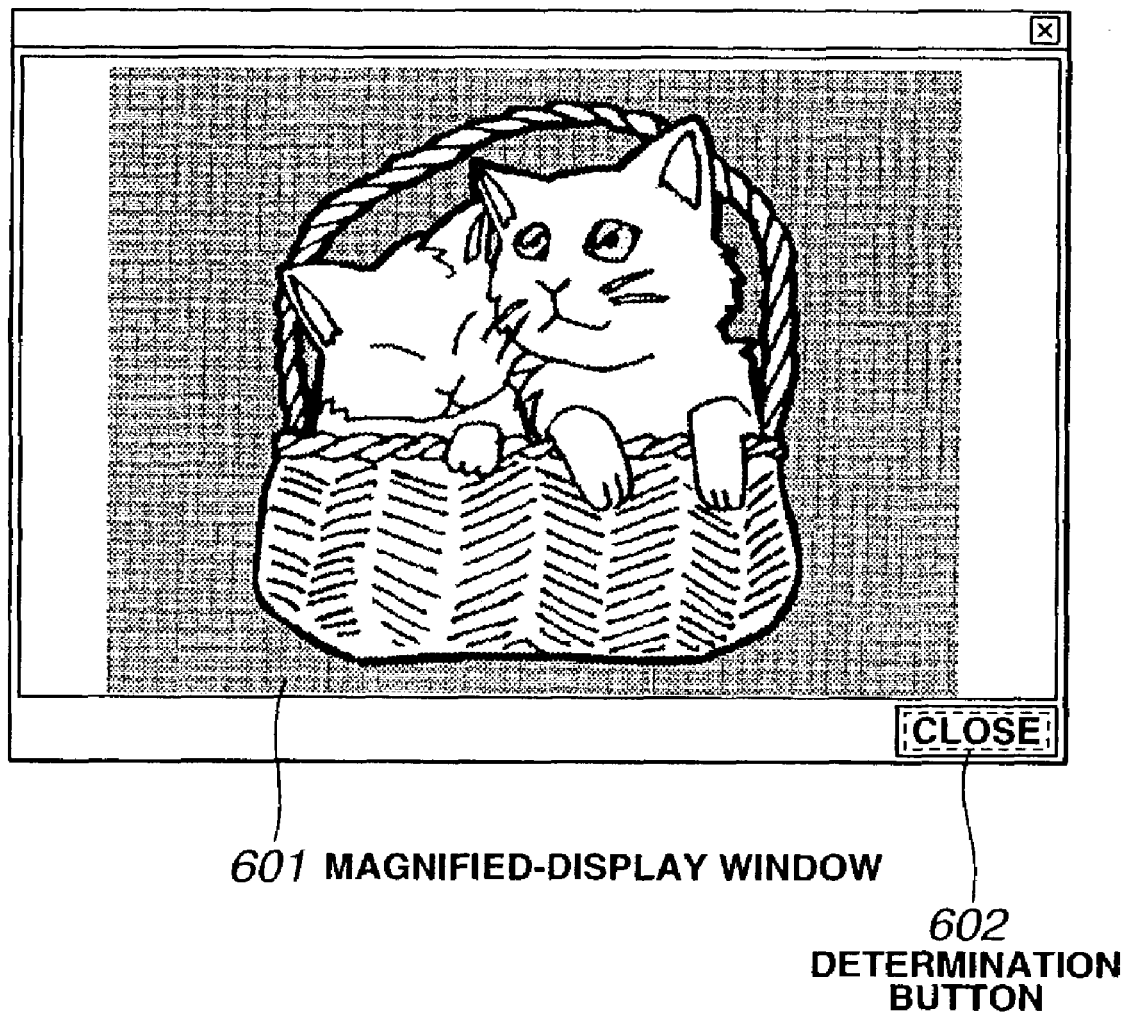
FIG. 6 is a diagram illustrating an outline of a magnified picture frame.

When the magnified-display button 305 is depressed in a state of selecting an image on the thumbnail display window 310, a magnified-display window 601 shown in FIG. 6 is displayed. By means of the magnified-image window 601, it is possible to confirm the selected image in detail. When a determination button ("close" button) 602 in the magnified-display window 601 is depressed, the magnified image window 601 is closed.

In this embodiment, the number of print copies is selected using the copy-number selection button 302 having the configuration of a seesaw switch. When the right side (+) of the copy-number selection button 302 is depressed, the assigned number of print copies displayed at the center of the copy-number selection button 302 is incremented by one. When the left side (−) of the copy-number selection button 302 is depressed, the number of print copies is decremented by one. When the assigned number of print copies becomes 0, the left side (−) of the copy-number selection button 302 is invalidated. When the assigned number of print copies becomes 99, the right side (+) of the copy-number selection button 302 is invalidated.

When the all-image selection button 307 is depressed, each of all images stored in a directory selected in the folder-tree window 309 is made in a state of being assigned to be printed. When the all release button 308 is depressed, assignment of printing of all images is released. When the selected-image determination button 306 is depressed, a printing-medium assigning picture frame is provided.

When there exists an image file having an assigned number of print copies of at least one, the sheet selection tab 303 and the printing tab 304 are validated. When such an image file is absent, the sheet selection tab 303 and the printing tab 304 are invalidated. When the sheet selection tab 303 is depressed, the printing-medium assigning picture frame is displayed. When the printing tab 304 is depressed, a layout assigning picture frame is displayed. When the determination button 306 is depressed, the printing-medium assigning picture frame is displayed.

Figure 4:
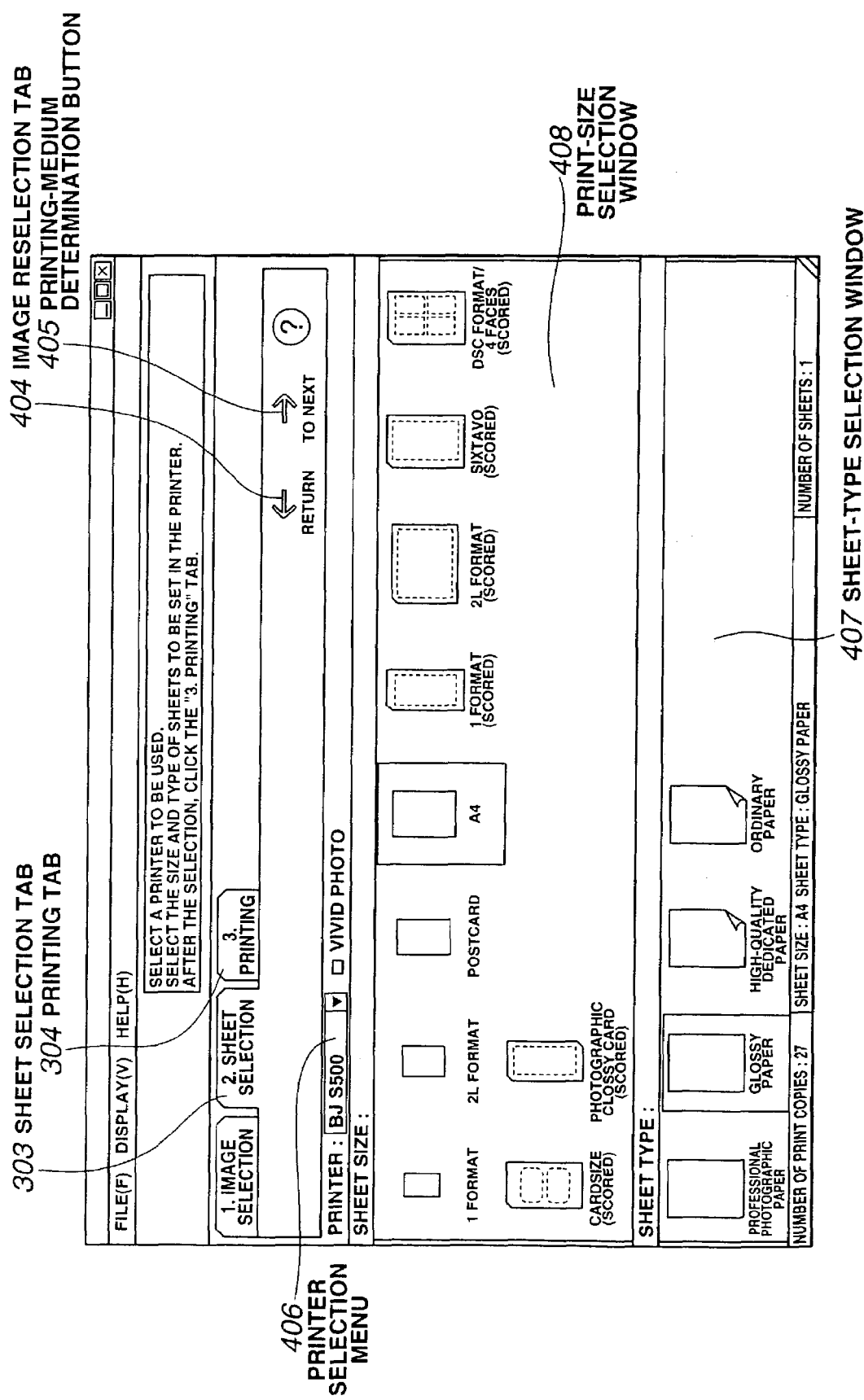
FIG. 4 is a diagram illustrating an outline of an output-medium selection picture frame.

FIG. 4 is a diagram illustrating an outline of the printing-medium assigning picture frame in this embodiment. In FIG. 4, a printer selection menu button 406 is for selecting a printer to which an image is to be output from a pull-down menu, and the name of the selected printer is displayed. In the pull-down menu, a summary of printers connected to the printing device is displayed. A checkbox titled "VIVID photo" present to the right of the printer selection menu button 406 is for assigning whether or not particular color correction processing provided by a printer driver is to be applied. This check box is validated only when a "VIVID photo" function can be utilized by a printer selected from the printer selection menu. Although in this embodiment, the VIVID photo function is illustrated as an example of particular processing provided by the printer driver, any other appropriate processing may, of course, be adopted.

There are also shown a sheet-type selection window 407 for selecting the type of the sheet material, and a printing-size selection window 408 for selecting the printing size of an image. In accordance with the type of the output printer selected by the printer selection menu button 406, options displayed on the printing-size selection window 408 and the sheet-type selection window 407 are limited to appropriate ones. By thus limiting options, the user can assign printing without being aware of the printer and the sheet to be used. Furthermore, in accordance with the sheet size selected on the print-size selection window 408, an option for sheets displayed on the print-size selection window 408 is limited. Accordingly, every time the output printer is changed, the states of the print-size selection window 408 and the sheet-type selection window 407 are updated. In addition, every time the sheet size is changed, the state of the sheet selection tab 303 is updated.

When a printing-medium determination button 405 or the sheet selection tab 303 is depressed, an image-to-be-printed assigning picture frame is displayed. When an image reselection button 404 or the printing tab 304 is depressed, a layout assigning picture frame is displayed.

At the first use of this application software, a state of selecting the leading option in the list is provided. At the start of the second or succeeding use of the application software, a state of selecting in advance the option finally selected by the user is provided.

Figure 5:
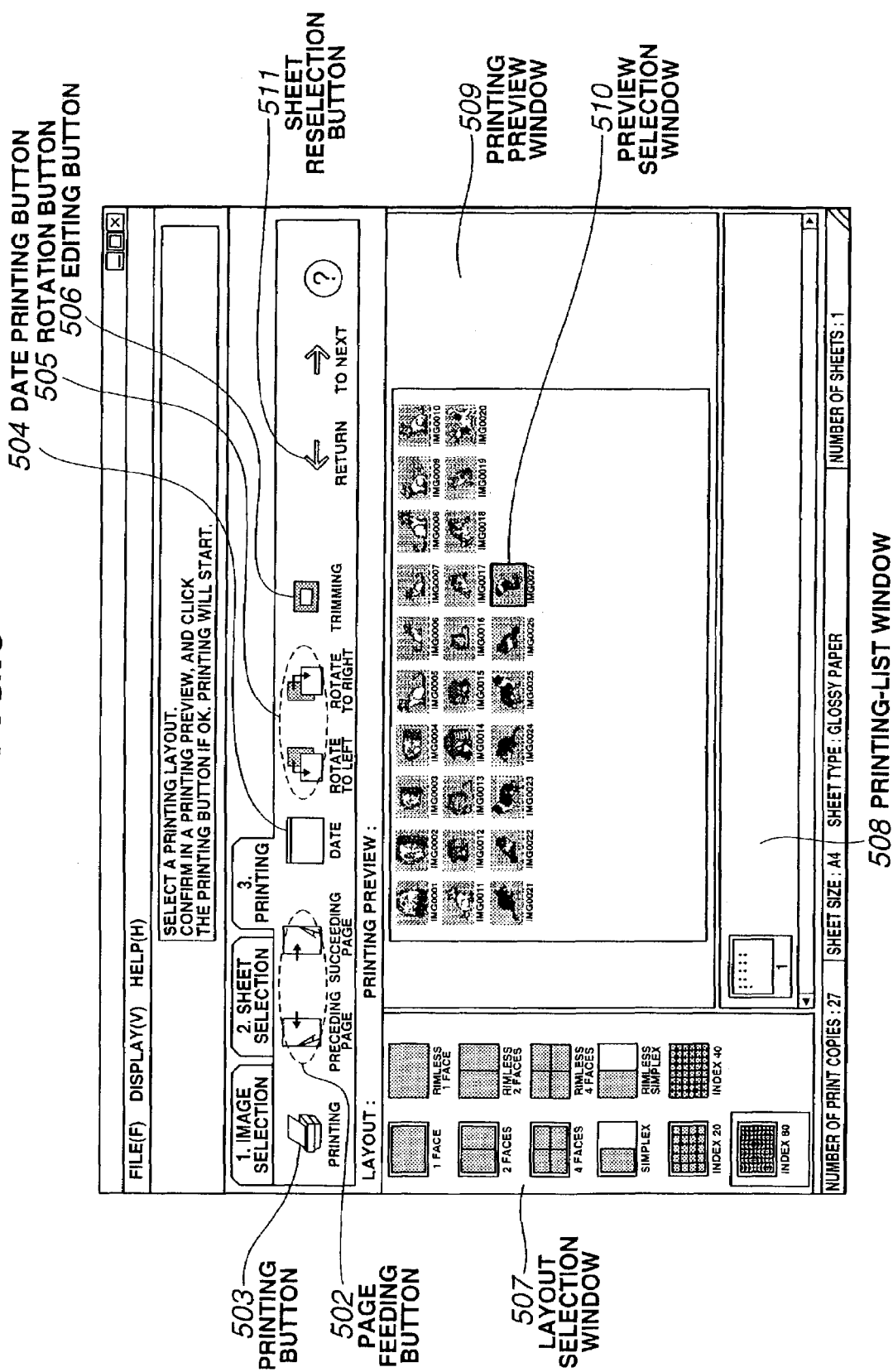
FIG. 5 is a diagram illustrating an outline of a layout selection picture frame.

FIG. 5 is a diagram illustrating a summary of the layout assigning picture frame in this embodiment.

In the layout assigning picture frame of the embodiment, a layout corresponding to the image to be printed and the printing medium that have been assigned in the image-to-be-printed assigning picture frame and the printing-medium assigning picture frame, respectively, is displayed in a layout selection window 507, a printing preview summary is displayed in a printing-list window 508 in accordance with the layout selected in the layout selection window 507, and a preview of a page selected on the printing-list window 508 is displayed in a printing-preview window 509.

The user can arbitrarily select a layout displayed in the layout selection window 507. When the selected window is changed, information in the printing-list window 508 and the printing-preview window 509 is updated. A page including an image selected in a preview selection window 510 is displayed on the printing-preview window 509. In the initial state of the layout assigning picture frame, a state in which the leading image of images to be printed is selected in the preview selection window 510 is provided.

In the layout assigning picture frame, as in the printing-medium assigning picture frame, when the same printing medium as the printing medium assigned at the immediately preceding start is selected, an immediately preceding layout that has been started and selected is used for the initial state.

An image can be selected and operated from preview images displayed on the printing-preview window 509 using the input device 104, such as a mouse or the like. The thus selected image is subjected to frame display in the preview selection window 510. By the user's depression of an editing button 506, an editing picture frame shown in FIG. 6 is displayed, and the image selected in the preview selection window 510 can be subjected to easy editing. An outline of an easy-editing picture frame will be described later.

By depressing a rotation button 505, the selected image is rotated by 90 degrees to the right or to the left in accordance with the depressed button. A point as close as possible to the center of the image region selected in the printing-preview window 509 is selected as the center of rotation. In the initial state, the image is circumscribed with the printing region while maintaining the aspect ratio of the image. That is, the image is arranged so as not to produce a margin in the printing region. Whether the target image is to be inscribed or circumscribed with the printing region can be assigned by the user in a setting picture frame (not shown).

When a date printing button 504 is depressed, display is updated by adding display of the date to the image in the printing-list window 508 and the printing preview window 509. When the date printing button 504 is again depressed, display is updated by releasing the display of the date. When a layout of index printing is assigned, the date printing button 504 is invalidated, so that display of the date cannot be assigned. Although in this embodiment, display of the date is not performed during index printing, printing of the date may, of course, be performed irrespective of the type of the layout.

A page feeding button 502 is for changing the current page in the printing-list window 508. By depressing the page feeding button 502, the display in the printing-preview window 509 is also updated. At that time, the image selected in the preview selection window 510 is also changed to the leading image on the current page after the change.

When a sheet reselection button 511 is depressed, the picture frame returns to the printing-medium assigning picture frame. When the image selection tab 301 is depressed, the image-to-be-printed assigning picture frame is displayed. When the sheet selection tab 303 is depressed, the printing-medium selection picture frame is displayed.

Figure 7:
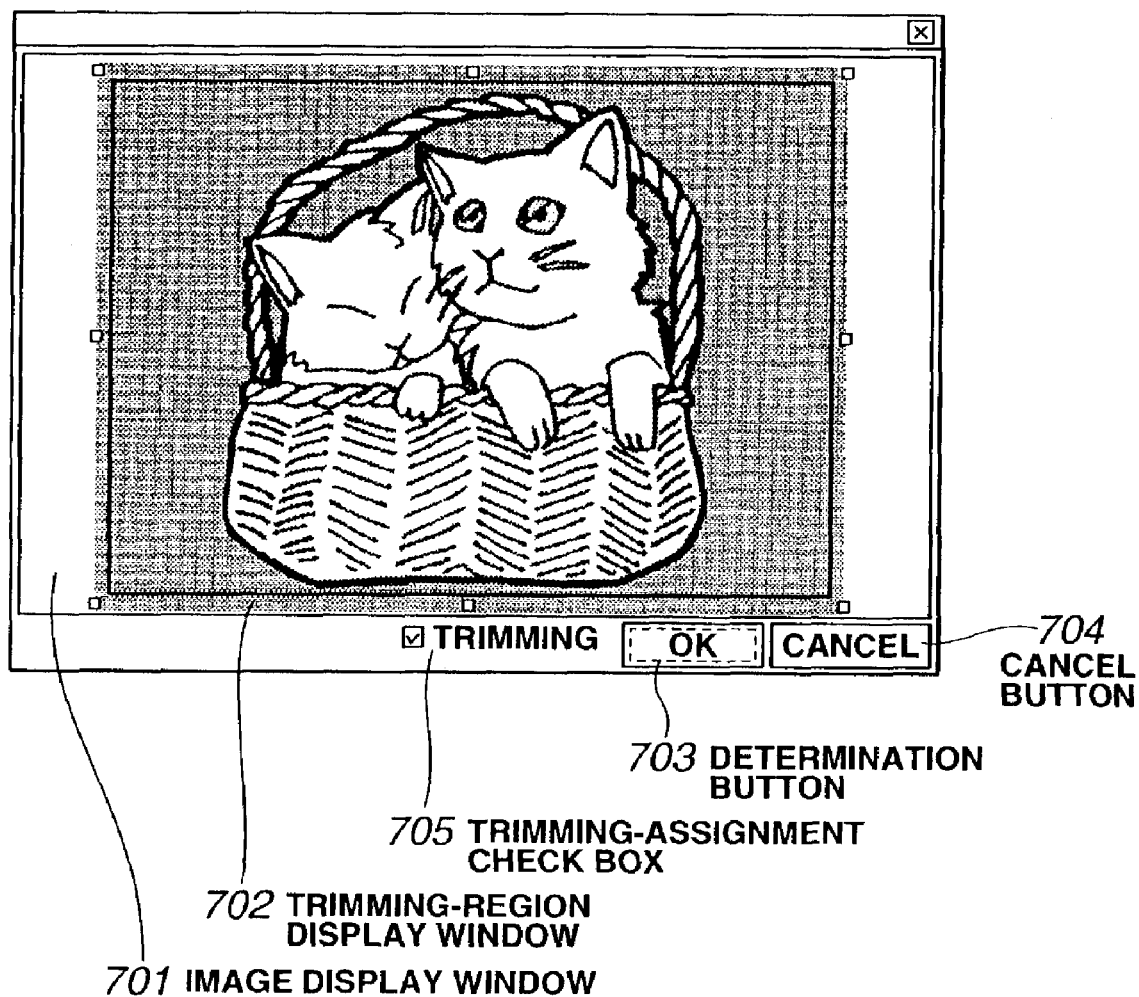
FIG. 7 is a diagram illustrating an outline of an image editing picture frame.

FIG. 7 is a diagram illustrating an outline of an easy-editing picture frame in the embodiment. In an image display window 701, the image selected in the preview selection window 510 is displayed. Within the image display window 701, a rectangular trimming-region display window 702 having an aspect ratio corresponding to the printing medium is displayed. In the trimming-region display window 702, the region after trimming is indicated with a frame. The size and the position of the trimming-region display window 702 can be changed using a pointing device, such as a mouse or the like.

The trimming-region display window 702 shown in FIG. 7 has twofold rectangular frames. Since all of the assigned region of the image cannot always be printed depending on the printer, borderless printing is sometimes realized by performing printing on a more or less larger region. In such a case, the trimming region differs from the actually printed region. The outer frame and the inner frame of the twofold frames in FIG. 7 indicate the trimming region and the actually printed region, respectively. When the trimming region coincides with the actually printed region, for example, in the case of printing other than borderless printing or in the case of not performing printing on a larger region, the trimming region is displayed using a single frame instead of twofold frames.

When a determination button 703 is depressed, the preview images displayed in the printing-preview window 509 and the printing-list window 508 are updated using the result of trimming, to be reflected on output to the printer. When a cancel button 704 is depressed, the picture frame returns to the layout selection picture frame by changing nothing.

The operation of performing borderless printing in which the image is not printed on a larger region, using the above-described image processing apparatus will now be described.

Figure 8A:
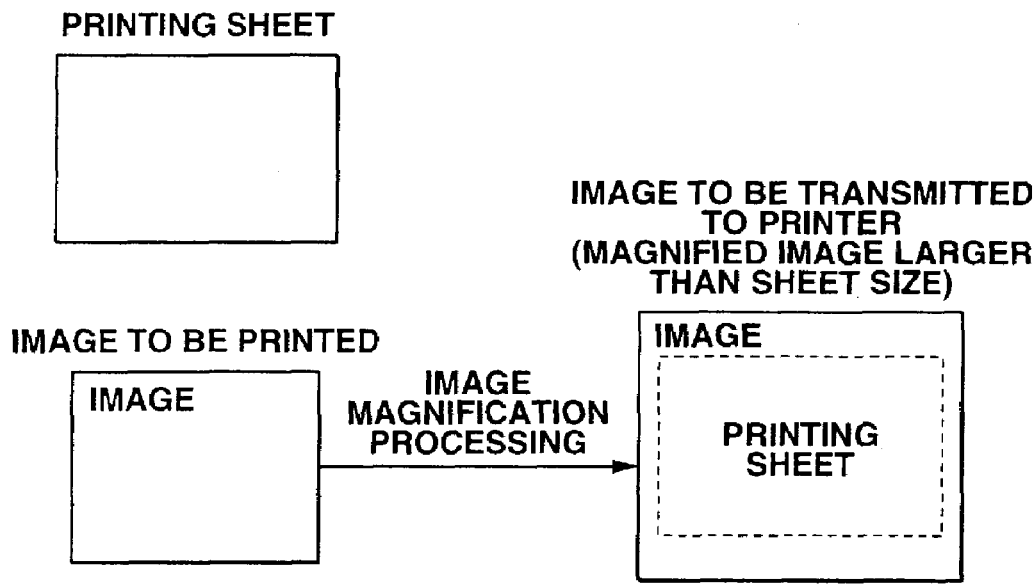
FIGS. 8A and 8B are diagrams, each illustrating an outline of conventional borderless printing.

Conventionally, when assigning a borderless layout, a magnified image having a size larger than the size of the printing medium is formed and transmitted to the printer, and printing is performed on a region larger than the sheet size. In this case, a part of the original image is lacked, and the angle of visibility changes (see FIG. 8A).

Figure 8B:
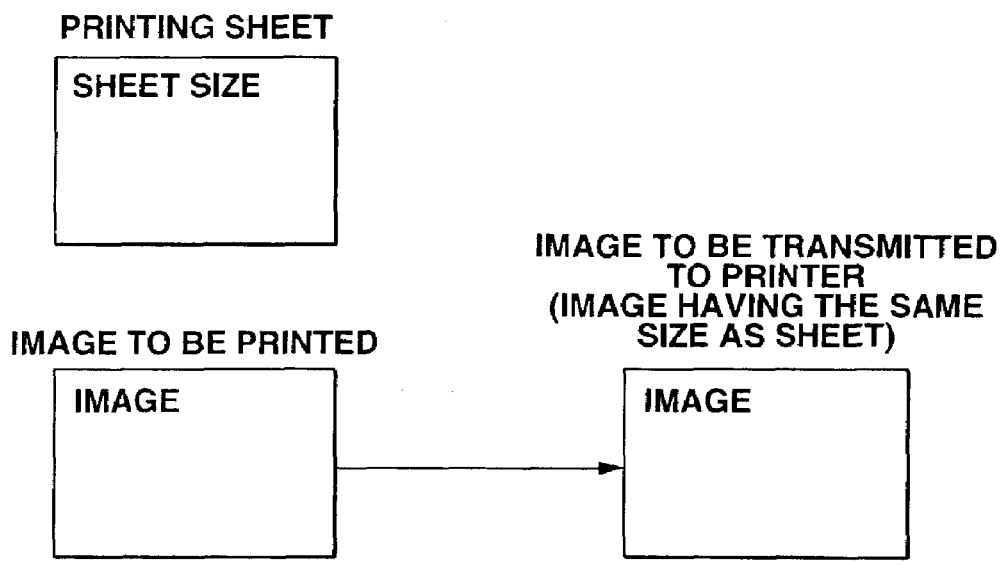

In another approach, printing is performed by transmitting an image having the same size as the sheet size without performing printing on a larger region. In this case, although theoretically, original image data is correctly printed without being lacked, a white frame may be produced due to an error in accuracy of sheet feeding, cutting of the sheet, or the like (see FIG. 8B).

Figure 9:
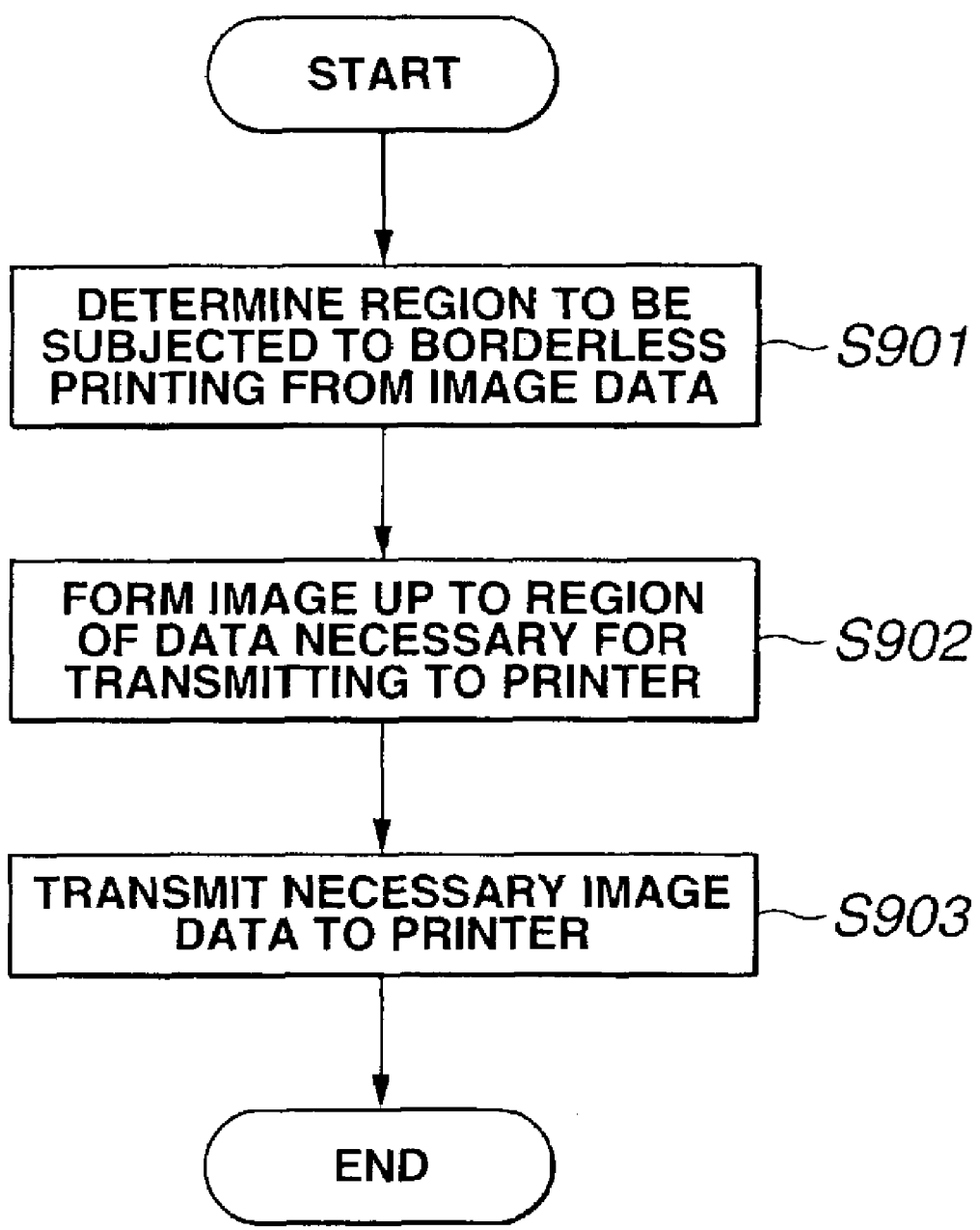
FIG. 9 is a flowchart illustrating processing during borderless printing.

A description will now be provided of a method for performing borderless printing according to the embodiment in which the appearance of a white frame is prevented while not changing (magnifying) the angle of visibility, with reference to the flowchart shown in FIG. 9.

First, in step S901, a region to be subjected to borderless printing is determined from the selected image data. This region for borderless printing may be automatically set by the image processing apparatus from the aspect ratio of the image to be printed and the aspect ratio of the selected printing sheet. Alternatively, the user may set this region in the easy-editing picture frame shown in FIG. 7. The aspect ratio of this region is determined from the sheet used for borderless printing.

Then, in step S902, an image up to the region of data that is to be actually transmitted to the printer is formed outside of the region for borderless printing of the image data.

Figure 10:
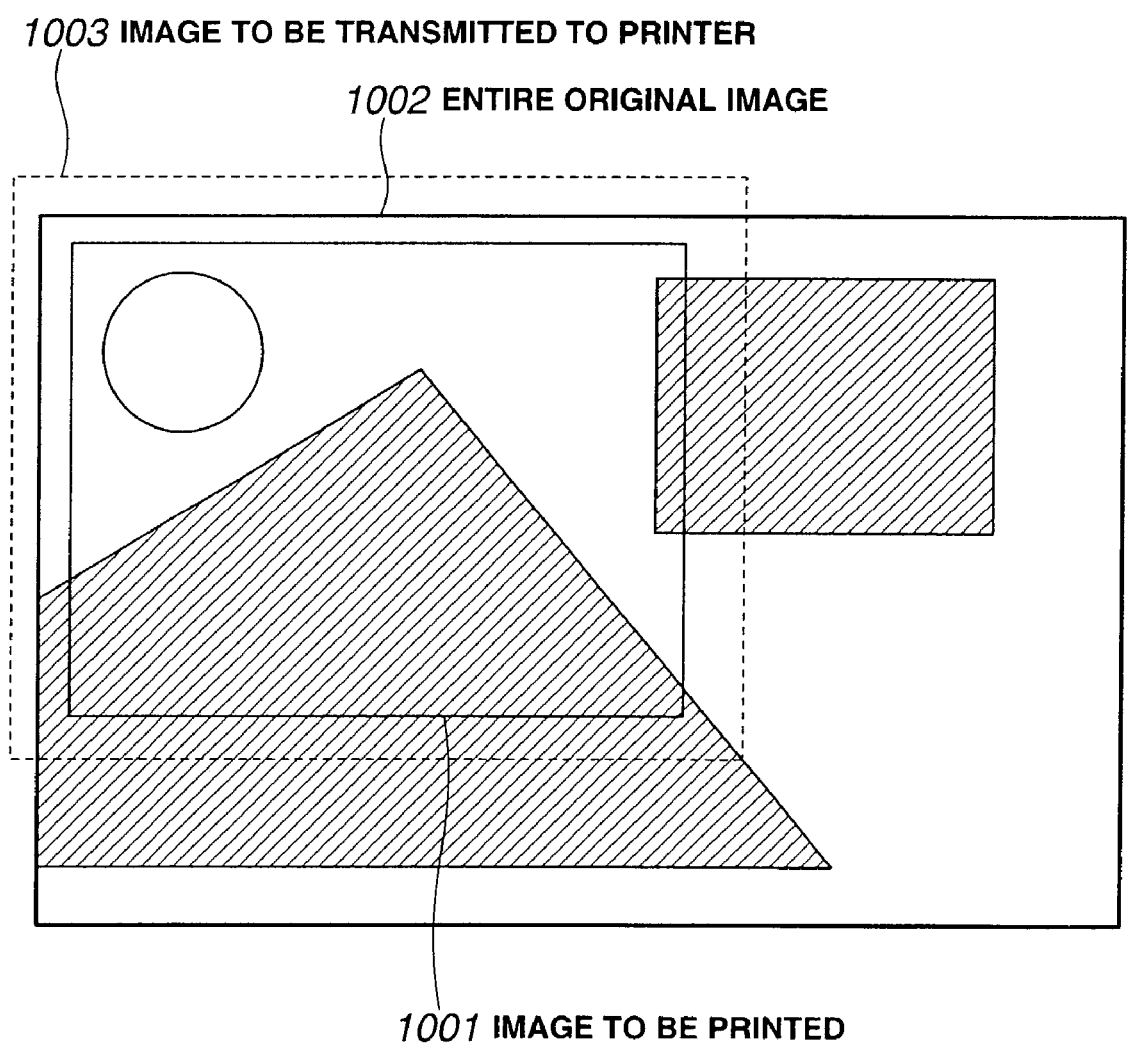
FIG. 10 is a diagram illustrating the relationship among an original image, an image region to be transmitted to a printer, and a printing region.

The relationship among the above-described image regions will now be described with reference to FIG. 10. In FIG. 10, there are shown the entire image 1002, a region 1001 to be subjected to borderless printing, and the region of an image 1003 to be actually transmitted to the printer.

Conventionally, printing is performed by transmitting only the region to be printed to the printer. In this case, however, there is the possibility that a white frame is produced at end portions of the sheet due to an error in accuracy of sheet feeding, cutting of the sheet, or the like. Accordingly, in consideration of such an error, image data that is more or less (for example, 0.5-1.5 mm) larger than the region to be subjected to borderless printing is transmitted to the printer. As a result, there is little possibility that a white frame is produced at end portions of the sheet even if an error is present.

Figure 11:
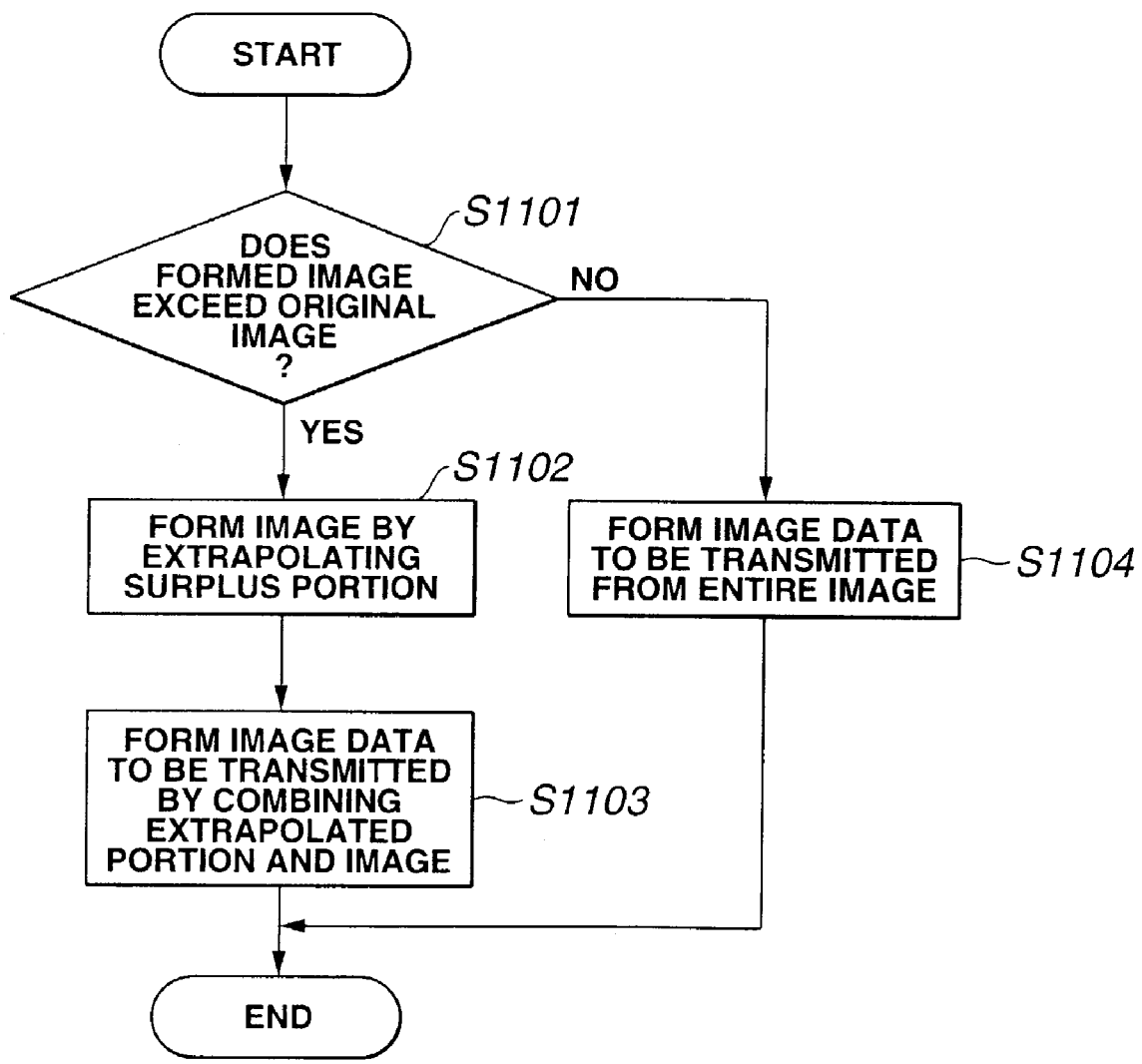
FIG. 11 is a flowchart illustrating processing for extrapolating image data.

Processing for forming image data to be transmitted to the printer will now be described with reference to the flowchart shown in FIG. 11.

First, in step S1101, it is determined whether or not the image to be formed exceeds original image data.

Figure 12:
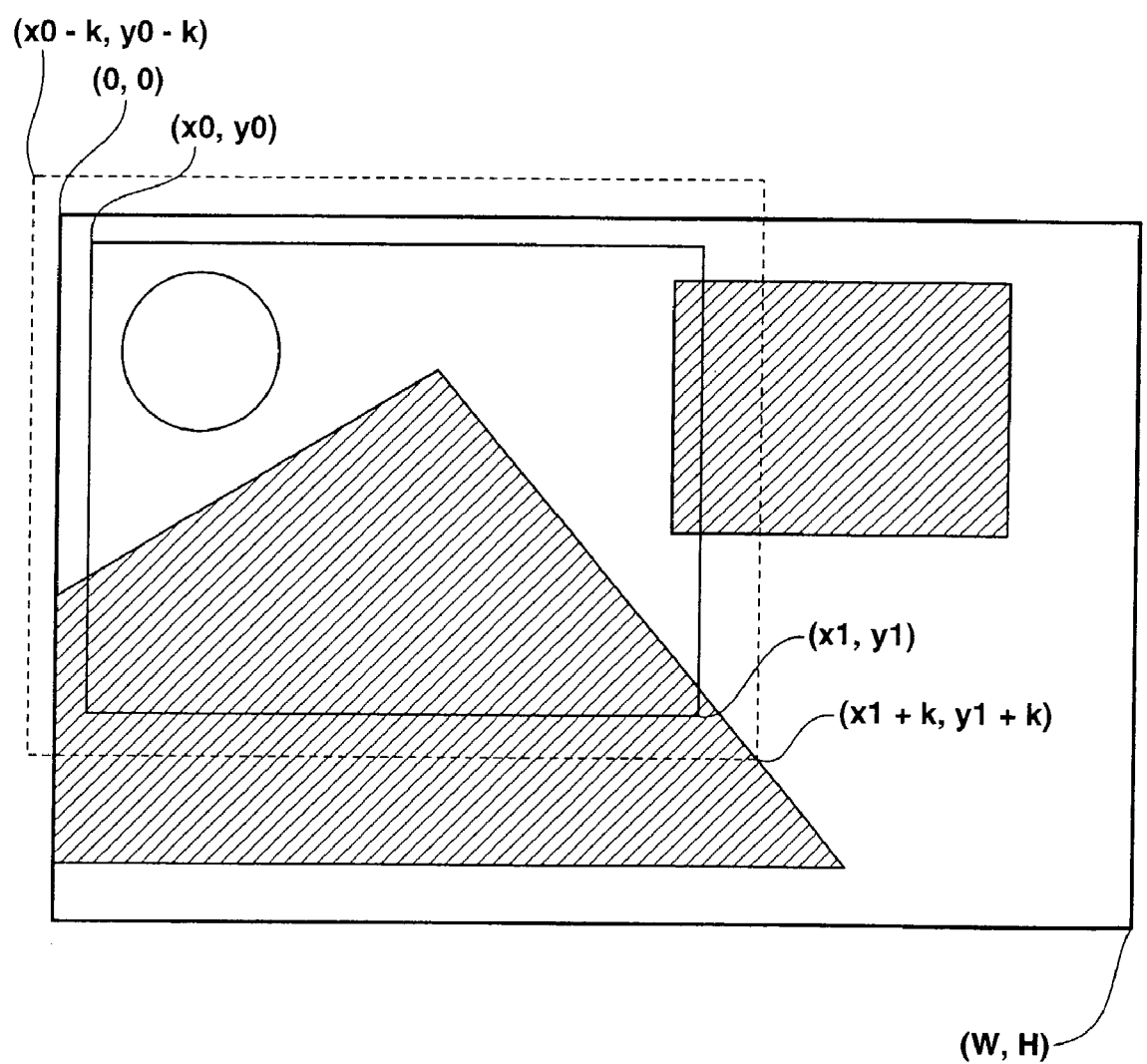
FIG. 12 is a diagram illustrating the coordinates of each of the regions shown in FIG. 10.

This processing will now be described with reference to FIG. 12. FIG. 12 illustrates the coordinates of image data to be printed, the original image, and image data to be transmitted to the printer. The height and the width of the original image data are represented by H and W, respectively, and the coordinates of the upper left and lower right points of the image to be printed are represented by (x0,y0) and (x1, y1), respectively. If the image having a larger size to be transmitted to the printer is expanded from the original image by k in the vertical upper and lower directions and in the horizontal leftward and rightward directions, the coordinates of the upper left and lower right points of the image to be transmitted to the printer are (x0−k, y0−k), and (x1+k, y1+k), respectively.

If the range of the coordinates (x, y) within the original image is assumed to be $(0 \leq x \leq W-1, 0 \leq y \leq H-1)$, whether or not the image data to be transmitted to the printer exceeds the original image data can be determined whether or not any one of conditions of x0−k<0, y0−k<0, x1+k≧W, and y1+k>H is satisfied.

If the result of the determination in step S1101 is affirmative, the process proceeds to step S1102. If the result of the determination in step S1101 is negative, it indicates that the image data to be transmitted to the printer is all within the original image data, and therefore extrapolation processing is unnecessary. Hence, the process proceeds to step S1104.

In step S1102, extrapolation processing is performed. Then, in step S1103, image data to be transmitted to the printer is formed by combining the extrapolated portion and the image data.

Figure 13:
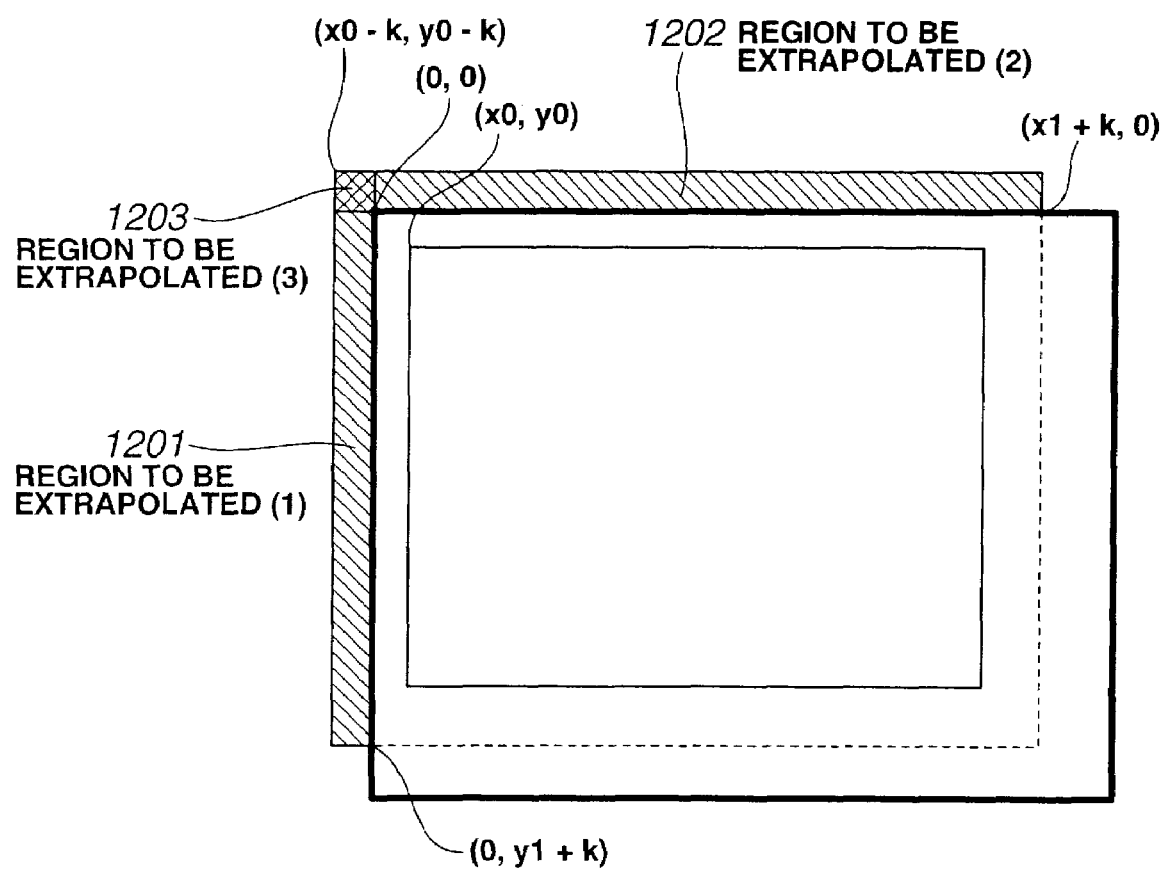
FIG. 13 is a diagram illustrating regions to be extrapolated.

This operation will now be described with reference to FIG. 13. In FIG. 13, a region surrounded by thin solid lines indicates a region to be subjected to borderless printing, a region surrounded by thick solid lines indicates the region of the original image, and a region surrounded by broken lines indicates an example of a region to be transmitted to the printer.

Regions to be extrapolated are region (1) 1201, region (2) 1202, and region (3) 1203. The region (1) is formed by copying a line between the coordinates (0, 0) and (0, y1+k) in the leftward direction by |x0−k| lines.

The region (2) is formed by copying a line between the coordinates (0, 0) and (x1+k, 0) in the rightward direction by |y0−k| lines.

The region (3) is formed by copying the point having the coordinates (0, 0) of the original image from the coordinates (x0−k, y0−k) to (0, 0).

Data of the regions to be extrapolated is formed in the above-described manner and is combined with remaining data within the original image, to form data to be transmitted to the printer.

In step S1104, since extrapolation processing is unnecessary, image data to be transmitted is formed from the original image data.

After thus forming data necessary for transmitting to the printer, then, in the above-described step S903, necessary image data is transmitted to the printer.

Figure 14:
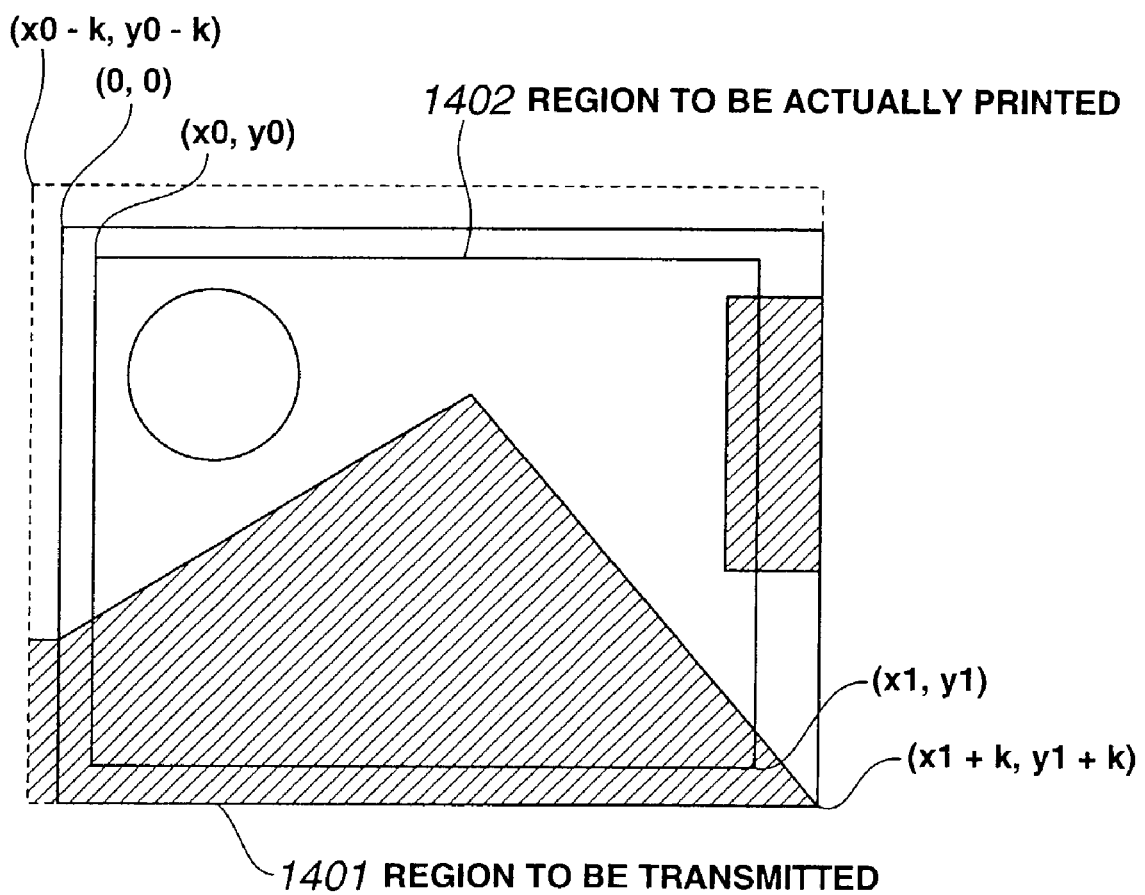
FIG. 14 is a diagram illustrating the relationship between an image region to be transmitted to a printer, and a printing region.

Actually, image data 1401 shown in FIG. 14 is transmitted, and image data 1402 is printed by an ideal printer that operates with producing no error. An excellent borderless photograph can be obtained from data within the image data 1401 without producing a white frame and changing the angle of visibility even if a certain amount of error is produced.

As described above, according to the embodiment, when performing borderless printing, it is possible to perform printing without producing a white frame and without changing the angle of visibility of an image of a printing region, even if the printing region includes end portions of an original image.

Although in the embodiment, data is transmitted to the printer after combining data to be transmitted in advance, original image data and extrapolated data may be sequentially transmitted to the printer.

Although in the embodiment, an image is expanded by an amount of k pixels in the vertical upper and lower directions and in the horizontal leftward and rightward directions, the amount of expansion may differ for respective sides.

Furthermore, instead of the determination of presence of a surplus region in step S1101, it may be determined whether or not the coordinates of a printing region are within k from respective end portions of the original image. That is, if the result of the determination is affirmative, extrapolation is necessary because the region to be transmitted to the printer exceeds the original image. If the result of the determination is negative, extrapolation is unnecessary.

The objects of the present invention may, of course, also be achieved by supplying a system or an apparatus with a storage medium storing program codes of software for realizing the functions of the above-described embodiment, and reading and executing the program codes stored in the storage medium by means of a computer (or a CPU or an MPU (microprocessor unit)) of the system or the apparatus.

In such a case, the program codes themselves read from the storage medium realize the functions of the above-described embodiment, so that the storage medium storing the program codes constitutes the present invention.

For example, a floppy disk, a hard disk, an optical disk, a magnetooptical disk, a CD(compact disk)-ROM (read-only memory), a CD-R (recordable), a magnetic tape, a nonvolatile memory card, a ROM, an EEPROM (electrically erasable and programmable read-only memory) or the like may be used as the storage medium for supplying the program codes.

The present invention may, of course, be applied not only to a case in which the functions of the above-described embodiment are realized by executing program codes read by a computer, but also to a case in which an OS (operating system) or the like operating in a computer executes a part or the entirety of actual processing, and the functions of the above-described embodiment are realized by the processing.

The present invention may, of course, be applied to a case in which, after writing program codes read from a storage medium into a memory provided in a function expanding board inserted into a computer or in a function expanding unit connected to the computer, a CPU or the like provided in the function expanding board or the function expanding unit performs a part or the entirety of actual processing, and the functions of the above-described embodiment are realized by the processing.

The present invention may be applied to a system comprising a plurality of apparatuses, or to an apparatus comprising a single unit.

The present invention may, of course, be applied to a case in which the objects of the invention are achieved by supplying a system or an apparatus with a program. In such a case, by reading a storage medium storing the program represented by software for achieving the objects of the invention into the system or the apparatus, the system or the apparatus can be provided with the effects of the invention.

Furthermore, by downloading and reading a program represented by software for achieving the objects of the present invention from a database on a network by means of a communication program, the system or the apparatus can also be provided with the effects of the present invention.

The individual components shown in outline or designated by blocks in the drawings are all well known in the image processing method and apparatus arts and their specific construction and operation are not critical to the operation or the best mode for carrying out the invention.

While the present invention has been described with respect to what is presently considered to be the preferred embodiment, it is to be understood that the invention is not limited to the disclosed embodiment. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing method comprising:
    performing by a processor the following:
    designating a borderless printing mode;
    determining, from an original image, a printing region for actual printing performed on a recording medium, the printing region corresponding to a size of paper for recording, and determining an expanded region that is expanded outward from the printing region for borderless printing;
    discriminating whether or not the expanded region determined in said region determining step exceeds the original image;
    extrapolating, if the expanded region exceeds the original image, an image data for the expanded region based on copying image data of pixels from an end portion of the original image adjacent to the expanded region;
    forming data for printing based on the extrapolated image for the expanded region and the original image,
    wherein the image data is extrapolated for a part of the expanded region that exceeds the original image and the image data is not extrapolated for a part of the expanded region that does not exceed the original image.

2. A method according to claim 1, wherein the printing region is determined from an aspect ratio of a printing sheet and an aspect ratio of an image to be printed.

3. A method according to claim 1, wherein the printing region is determined by assigning a region corresponding to the aspect ratio of a printing sheet by a user.

4. A method according to claim 1, wherein the printing region is determined based on a region corresponding to a center of a region assigned by a user and the aspect ratio of a printing sheet.

5. A method according to claim 1, wherein the expanded region is a region that the printing region is magnified by a same amount in vertical upper and lower directions and in horizontal leftward and rightward directions.

6. A method according to claim 1, wherein the expanded region is a region that the printing region is magnified by independently assignable amounts in vertical upper and lower directions and in horizontal leftward and rightward directions.

7. An image processing method comprising:
    performing by a processor the following:
    designating a borderless printing mode;
    determining a printing region corresponding to a size of paper for recording from an original image;
    discriminating whether or not the printing region is within a predetermined distance from respective end portions of the original image; and
    forming image data for borderless printing by expanding the printing region,
    when it is discriminated that the printing region is within the predetermined distance from respective end portions of the original image in said discrimination step, adding image data extrapolated based on copying image data of respective end lines of pixels of the respective end portions of original image data of the original image, and forming image data for borderless printing in said forming step
    wherein the image data is extrapolated for a part of the expanded region that exceeds the original image and the image data is not extrapolated for a part of the expanded region that does not exceed the original image.

8. An image processing apparatus comprising:
a designating unit for designating a borderless printing mode;
a determining unit for determining, from an original image, a printing region for actual printing performed on a recording medium, the printing region corresponding to a size of paper for recording, and determining an expanded region that is expanded outward from the printing region for borderless printing;
a discrimination unit for discriminating whether or not the expanded region exceeds the original image;
an extrapolation unit for extrapolating, if the expanded region exceeds the original image, an image data for the expanded region based on copying image data of pixels from an end portion of the original image adjacent to the expanded region; and
a formation unit for forming data for printing based on the extrapolated image for the expanded region and the original image,
wherein the image data is extrapolated for a part of the expanded region that exceeds the original image and the image data is not extrapolated for a part of the expanded region that does not exceed the original image.

9. An image processing apparatus comprising:
a designating unit for a borderless printing mode;
a region determining unit for determining a printing region corresponding to a size of paper for recording from an original image;
a discrimination unit for discriminating whether or not the printing region determined by said region determining unit is within a predetermined distance from respective end portions of the original image; and
a formation unit for forming image data for borderless printing by expanding the printing region determined by said region determining unit,
when said discriminating unit discriminates that the printing region is within the predetermined distance from respective end portions of the original image, said discriminating unit adds image data extrapolated based on copying image data of respective end lines of pixels of the respective end portions of original image data of the original image, and forming image data for borderless printing in said formation unit
wherein the image data is extrapolated for a part of the expanded region that exceeds the original image and the image data is not extrapolated for a part of the expanded region that does not exceed the original image.

10. A computer-readable storage medium storing a program for executing an image processing method, said image processing method comprising:
designating a borderless printing mode;
determining, from an original image, a printing region for actual printing performed on a recording medium, the printing region corresponding to a size of paper for recording, and determining an expanded region that is expanded outward from the printing region for borderless printing;
discriminating whether or not the expanded region exceeds the original image;
extrapolating, if the expanded region exceeds the original image, an image data for the expanded region based on copying image data of pixels from an end portion of the original image adjacent to the expanded region; and
forming data for printing based on the extrapolated image for the expanded region and the original image
wherein the image data is extrapolated for a part of the expanded region that exceeds the original image and the image data is not extrapolated for a part of the expanded region that does not exceed the original image.

11. A computer-readable storage medium storing a program for executing an image processing method, said image processing method comprising:
determining a printing region corresponding to a size of paper for recording from an original image;
discriminating whether or not the printing region is within a predetermined distance from respective end portions of the original image; and
forming image data for borderless printing by expanding the printing region,
when it is discriminated that the printing region is within the predetermined distance from respective end portions of the original image in said discrimination step, adding image data extrapolated based on copying image data of respective end lines of pixels of the respective end portions of original image data of the original image, and forming image data for borderless printing in said forming step
wherein the image data is extrapolated for a part of the expanded region that exceeds the original image and the image data is not extrapolated for a part of the expanded region that does not exceed the original image.

12. An image processing method according to claim 1, wherein the image at the end portions of the original image is copied and an image of the surplus regions is formed in said extrapolating step.

13. An image processing method according to claim 7, wherein the image at the end portions of the original image is copied and added to the original image and image data for borderless printing is formed in said forming step.

14. An image processing apparatus according to claim 8, wherein said extrapolating unit copies the image at the end portions of the original image and forms an image of the surplus region.

15. An image processing apparatus according to claim 9, wherein the forming unit copies the image at the end portions of the original image, adds the copied image to the original image and forms image data for borderless printing.

* * * * *